United States Patent

Honma et al.

[11] Patent Number: 5,821,409
[45] Date of Patent: Oct. 13, 1998

[54] SCANNING NEAR-FIELD OPTIC/ATOMIC-FORCE MICROSCOPE WITH OBSERVING FUNCTION IN LIQUID

[75] Inventors: Katsunori Honma; Hiroshi Muramatsu; Norio Chiba, all of Chiba, Japan

[73] Assignee: Seiko Instruments Inc., Japan

[21] Appl. No.: 525,348

[22] Filed: Sep. 7, 1995

[30] Foreign Application Priority Data

Sep. 9, 1994 [JP] Japan ................................ 6-216438

[51] Int. Cl.$^6$ ................................ G01B 5/28; H01J 3/14
[52] U.S. Cl. ........................................................... 73/105
[58] Field of Search ............................. 73/105; 250/306

[56] References Cited

U.S. PATENT DOCUMENTS

| | | | |
|---|---|---|---|
| 4,935,634 | 6/1990 | Hansma et al. | 250/306 X |
| 5,254,854 | 10/1993 | Betzig | 250/306 X |
| 5,272,330 | 12/1993 | Betzig et al. | 250/216 |
| 5,294,804 | 3/1994 | Kajimura | 250/561 |
| 5,343,460 | 8/1994 | Miyazaki et al. | 250/306 X |
| 5,382,789 | 1/1995 | Aoshima | 250/235 X |
| 5,389,779 | 2/1995 | Betzig et al. | 250/306 X |
| 5,539,197 | 7/1996 | Courjon et al. | 250/306 X |
| 5,548,113 | 8/1996 | Goldberg et al. | 250/306 X |

FOREIGN PATENT DOCUMENTS

| | | |
|---|---|---|
| 545538 | 6/1993 | European Pat. Off. . |
| 564088 | 10/1993 | European Pat. Off. . |
| 593835 | 4/1994 | European Pat. Off. . |

OTHER PUBLICATIONS

Review of Scientific Instruments, vol. 63, No. 9, Sep. 1, 1992, pp. 4061–4065, Shmuel Shalom et al., "A Micropipette Force Probe Suitable For Near–Field Scanning Optical Microscopy".

SPIE (Scanning Probe Microscopies 1992, Los Angeles) vol. 1639, Jan. 20, 1992, Bellingham, U.S., pp. 36–43, N.F. Van Hulst et al., "Operation of a Scanning Near Field Optical Microscope in Reflection in Combination with a Scanning Force Microscope".

Applied Physics Letters, vol. 66, No. 24, Jun. 12, 1995, N.Y., U.S., pp. 3245–3247, Hiroshi Muramatsu et al., "Near–Field Optical Microscopy in Liquids".

Toledo–Crow et al., "Near–Field Differential Scanning Optical Microscope with Atomic Force Regulation", Appl. Phys. Lett., vol. 60, No. 24, 15 Jun. 1992, pp. 2957–2959.

Primary Examiner—Hezron E. Williams
Assistant Examiner—Daniel S. Larkin
Attorney, Agent, or Firm—Adams & Wilks

[57] ABSTRACT

A scanning near-field optic/atomic-force microscope comprises a holder for holding a sample immersed in a liquid, and a plate disposed over the holder for covering a surface of the liquid and for transmitting therethrough a laser light. A probe has an optical propagation body terminating in a distal end, and a light reflecting element disposed thereon, and the probe is immersed in the liquid. A light source emits a light which is introduced into the optical propagation body of the probe, which guides the light through the probe and out the distal end thereof to irradiate the sample. A detecting device detects information from the light irradiated on the sample and converts the information to an electric signal. A laser source irradiates the light reflecting element of the probe with a laser light for detecting a bending amount of the probe resulting from an interaction between the sample and the probe. An angle adjusting mechanism adjusts an optical axis of the laser light transmitted through the plate. A photoelectric conversion device receives the laser light reflected from the light reflecting element and converts the reflected light into an electric signal. A moving mechanism moves the sample relative to the probe, and a distance control device controls a distance between the surface of the sample and the distal end of the probe.

13 Claims, 5 Drawing Sheets

SCANNING NEAR-FIELD OPTIC/ATOMIC-FORCE MICROSCOPE WITH OBSERVING FUNCTION IN LIQUID

BACKGROUND OF THE INVENTION

The present invention relates to a scanning near-field optic/atomic-force microscope with observing function in liquid capable of observing a biological sample, an organic thin film sample and the like in a liquid by utilizing a scanning near-field optic/atomic-force microscope for observing a surface configuration and optical properties of the sample.

There is a fluorescence microscope as a microscope which is effective in observing a biological sample such as microorganisms or cells or an organic thin film sample such as an LB film. The fluorescence microscope utilizes enhancement of contrast in an object substance by coloring it with a fluorescence dye. In recent years a near-field optical microscope having a higher resolution has been utilized in observing these samples.

The near-field optical microscope can provide a spatial resolution exceeding a wavelength limit whereby a diffraction limit of light is exceeded by using near-field optical effect and is considered extremely effective also in observing a biological sample or an organic thin film sample colored with a fluorescence dye.

The very important point in constituting the near-field optical microscope using the near-field optical effect is that a distance between a distal end of a probe comprised of an optical fiber and the surface of a sample is to be controlled at a predetermined value or below with high accuracy where the predetermined value is substantially one tenth of a wavelength of light in use. For this purpose Betzig et al. vibrated a probe in a plane in parallel with the surface of a sample and positioning of the probe is performed by detecting changes in an amplitude and a phase of the vibration caused by a shear stress operated on the probe (E. Betzig et al. Appl. Phys. Lett. 60(20), pp. 2484–2486, 18 May 1992; Japanese Unexamined Patent Publication No. 50750/1994).

It is necessary to immerse a sample in a liquid due to a property of a fluorescence dye wherein in case where the fluorescence dye is applied on a biological sample etc., the fluorescent light is not emitted when the fluorescent substance has been dried. Further, in case of a biological sample such as microorganisms or cells etc. it is necessary to preserve it in a liquid to keep the biological sample alive.

Furthermore, the fluorescent substance is provided with a property wherein its emitting state is changed by the pH value and therefore, various optical properties of a sample can be provided by changing the kind of solution for immersing the sample.

Here, in a near-field microscope a shear force has been utilized to control the distance between a probe and the surface of a sample as mentioned above. A major generating mechanism of this shear force is derived from adsorbed water on the surface of the sample and, therefore, it is considered that a sufficient change in the shear force cannot be provided even if it is operated in a liquid since there is no adsorbed water in the liquid.

Accordingly, in observing a sample with a fluorescence dye or a biological sample such as microorganisms, cells etc. by using a conventional near-field microscope, methods such as observing the sample after moistening it and fixing it to a glass plate or the like have been adopted. In case of observing a sample in such a way, it is inevitable that the humidity of the sample is gradually lowered and it has been difficult to constantly maintain for a long time the emittance of fluorescent light or the survival state of a living thing.

SUMMARY OF THE INVENTION

It is an object of the present invention to provide a near-field microscope capable of observing a biological sample, an organic thin film sample etc. in a liquid.

According to a first aspect of the present invention to solve the above-mentioned problem, there is provided a scanning near-field optic/atomic-force microscope with observing function in liquid including: a liquid holding sample plate for immersing and holding a sample in a liquid; a surface keeping window plate arranged above the liquid holding sample plate for covering a surface of the liquid; a probe having a transmission hole for transmitting a light at a distal end portion thereof and a light reflecting means at a portion thereof, the distal end portion being immersed in the liquid and arranged above an upper surface of the sample; a probe holder for holding the probe; a light source for emitting the light irradiating the sample via the transmission hole; a detecting means for detecting a light information from the sample caused by the irradiated light and converting the light information into an electric signal; a laser source emitting a laser light irradiating the light reflecting means for detecting a bending amount of the probe caused by an interaction between the sample and the probe; a photoelectric conversion device for receiving a reflected light from the light reflecting means and converting the reflected light into an electric signal; a moving means for moving the probe relative to the sample; and a distance controlling means for controlling a distance between the surface of the sample and the distal end of the probe.

According to a second aspect of the present invention, there is provided the scanning near-field optic/atomic-force microscope with observing function in liquid according to the first aspect, wherein the liquid holding sample plate and the surface keeping window plate are disposed not in contact with each other.

According to a third aspect of the present invention, there is provided the scanning near-field optic/atomic-force microscope with observing function in liquid according to the first aspect, wherein the surface keeping window plate is disposed at a position maintaining the liquid between the surface keeping window plate and the liquid holding sample plate by a surface tension.

According to a fourth aspect of the present invention, there is provided the scanning near-field optic/atomic-force microscope with observing function in liquid according to the first aspect, wherein the light information from the sample caused by the irradiated light is an information of the light transmitted through the sample.

According to a fifth aspect of the present invention, there is provided the scanning near-field optic/atomic-force microscope with observing function in liquid according to the first aspect, wherein the light information from the sample caused by the irradiated light is an information of the light reflected from the sample.

According to a sixth aspect of the present invention, there is provided the scanning near-field optic/atomic-force microscope with observing function in liquid according to the first aspect, wherein the surface keeping window plate is formed by a material transmitting the laser light and is provided with an angle adjusting mechanism for adjusting an optical axis of the laser light.

According to a seventh aspect of the present invention, there is provided the scanning near-field optic/atomic-force microscope with observing function in liquid according to the first aspect, further comprising a vibrating mechanism vibrating the probe in a plane orthogonal to the surface of the sample.

According to an eighth aspect of the present invention, there is provided the scanning near-field optic/atomic-force microscope with observing function in liquid according to the first aspect, wherein the probe is provided with a corrosion resistant coating for preventing corrosion by the liquid at least at a portion thereof immersed in the liquid.

In contrast to the conventional near-field microscope, the scanning near-field optic/atomic-force microscope with observing function in liquid proposed by the inventors is a microscope wherein characteristics of a near-field microscope and an atomic-force microscope are compounded.

An atomic-force microscope utilizes an interatomic force which is operated when the distal end of a probe is made proximate to a distance of substantially several tens through several hundreds nano-meters(nm) from the surface of a sample. In the method, in case where a repulsive force of the interatomic force is utilized, positioning control of the probe is performed by detecting an amount of displacement when the probe is displaced by the repulsive force and a signal for the positioning control is expressed as a configuration of the surface of the sample.

Further, in the case where an attractive force of the interatomic force is utilized, the probe is vibrated in a plane orthogonal to a surface of the sample and a change in a vibration amplitude caused by the attractive force operated on the probe is detected whereby the positioning control of the probe is performed and a signal for the positioning control is expressed as the configuration of the surface of the sample.

A near-field optic/atomic-force microscope is also provided with the function of the near-field microscope by constituting the probe of the atomic-force microscope by an optical propagation body such as an optical fiber. By these two functions, an optical image accompanied by absorption, emittance or the like of light on the surface of a sample and a topographic image of the surface of the sample can independently and simultaneously be observed.

Specifically, in observing a biological sample colored by a fluorescence dye by the near-field optic/atomic-force microscope, an image of a fluorescent light intensity distribution (image of a fluorescence microscope) on the surface of the sample can be provided. At the same time an image of its surface configuration can also be observed.

As mentioned above, in the near-field optic/atomic-force microscope the interatomic force caused between the probe and the surface of the sample is utilized in controlling the distance between the probe and the surface of the sample. The interatomic force operates even in a liquid as in air which is different from the shear force. Accordingly, the near-field optic/atomic-force microscope is suitable for observing a biological sample etc. in a liquid.

In the scanning near-field optic/atomic-force microscope with observing function in liquid according to the present invention, the sample is immersed in an arbitrary liquid held on the liquid holding sample plate. Especially, in using a transmitted light as optical information, the liquid holding sample plate is placed on an optical system for condensing the transmitted light. Under this state, the distance between the probe holder and the liquid holding sample plate is made proximate such that the distal end of the probe disposed at the sample is made proximate to the vicinity of the surface of the sample. At that time the probe is immersed in the liquid.

Here, the surface of the liquid held on the liquid holding sample plate is maintained at a height that is equal to or more than a maximum height of the liquid holding sample plate. The difference between the heights is approximately 1 through 2 mm in the case where the liquid is water. The surface keeping window plate is disposed above the immersed probe and is installed such that an angular adjustment is made possible relative to the probe holder and it is disposed at a height where it is brought into contact with the surface of the liquid when the distal end of the probe is made proximate to the vicinity of the surface of the sample. When the distal end of the probe is made proximate to the vicinity of the surface of the sample, the surface of the liquid is brought into contact with the surface keeping window plate and a liquid layer is formed between the surface keeping window plate and the liquid holding sample plate. In this case, if the liquid is water, a water layer of approximately 1 through 2 mm is formed between the surface keeping window plate and the liquid holding sample plate.

The liquid is maintained always in a layer beneath the surface keeping window plate by such a constitution and, therefore, the scanning of the probe can always be performed below the liquid surface. Further, the space between the surface keeping window plate and the liquid holding sample plate is open although there is the liquid layer therebetween and, therefore, the probe made by a light propagating material can be introduced into the liquid.

Further, especially in the case where the transmitted light is used as the light information, since the liquid holding sample plate is made of an optically transparent material, the light is irradiated from the upper face of the sample and the light transmitted though the sample can be propagated to an optical system therebelow.

The surface keeping window plate is similarly made of an optically transparent material and is in a flat plate shape. Thereby, the laser light etc. for detecting the displacement of the probe can be transmitted. Further, since it is in close contact with the liquid layer, different from a case where the liquid face is exposed, the optical axis of the laser light can stably be secured and generation of irregular reflection of light can be restrained. In addition thereto an incident angle of the laser light from the laser source or an emitting angle of the laser light reflected by the reflecting face on the probe can be adjusted by adjusting the angle of the surface keeping window plate.

Further, the positioning control of the probe utilizing the attractive force of the interatomic force can be performed by installing a vibrator to the probe holder for vibrating the probe in a plane orthogonal to the surface of the sample. In this method the probe and the surface of the sample are periodically made proximate to each other and, therefore, there is an advantage in which the danger of destructing the probe and the sample is inconsiderable.

Furthermore, the metallic coating for forming a very small opening at the distal end the probe can be protected by applying a corrosion resistant coating thereon for preventing it from corroding by the liquid whereby long hours of observation of the sample can be performed.

BRIEF DESCRIPTION OF THE DRAWINGS

FIGS. 2A and 2B are photographs in place of drawings of a measurement example by a scanning near-field optic/ atomic-force microscope with observing function in liquid according to the present invention, wherein

FIGS. 3A and 3B are photographs in place of drawings of a measurement example of cells by a scanning near-field optic/atomic-force microscope with observing function in liquid according to the present invention, wherein

FIGS. 4A and 4B are photographs in place of drawings of another measurement example of the cells by a scanning near-field optic/atomic-force microscope with observing function in liquid according to the present invention, wherein

DETAILED DESCRIPTION OF THE PREFERRED EMBODIMENTS

An explanation will be given of embodiments of the present invention in reference to the drawings as follows.

Figure 1:
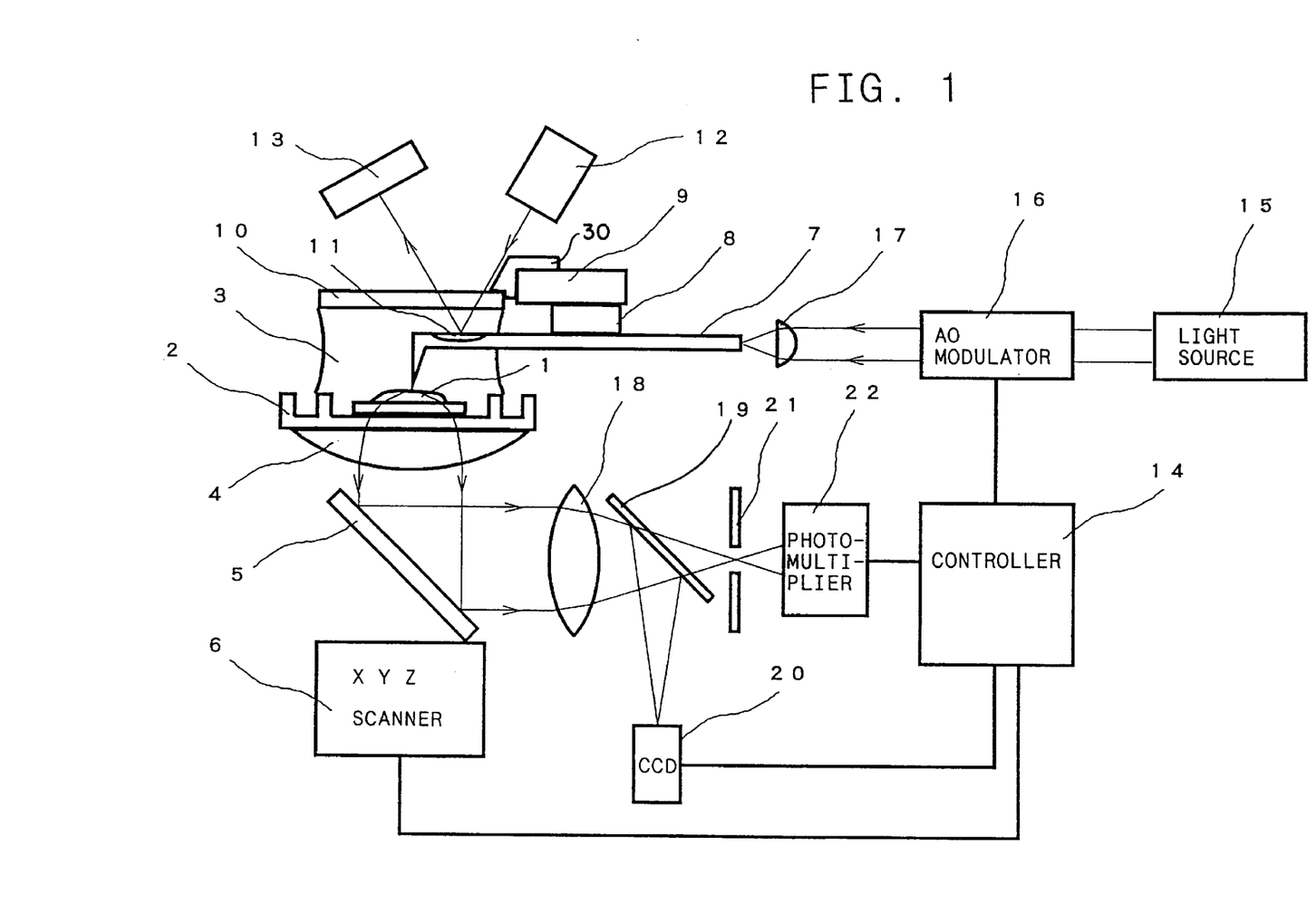
FIG. 1 is a schematic view showing an example of the structure of a scanning near-field optic/atomic-force microscope with observing function in liquid in the case where a transmitted light is observed.

FIG. 1 illustrates a first embodiment of the present invention and is a schematic view showing the structure of a scanning near-field optic/atomic-force microscope with observing function in liquid in the case of observing a transmitted light.

In FIG. 1 a sample 1 is immersed in an arbitrary liquid 3 held on a liquid holding sample plate 2. The liquid holding sample plate 2 is placed on a first lens 4.

The first lens 4 is installed above a mirror 5 and the mirror 5 is installed above an XYZ scanner 6 movable in the longitudinal, transverse and height directions.

A probe 7 is fixed to a probe holder 9 via a bimorph vibrator 8. A surface keeping window plate 10 is disposed above the probe 7 and is arranged in front of the probe holder 9 and is disposed at a height whereby a liquid layer is formed between it and the liquid holding sample plate 2 by a surface tension when the distal end of the probe 7 is made proximate to the vicinity of the surface of the sample 1.

A reflecting face 11 is constituted at a portion on the upper side of the probe 7. A laser source 12 and a photoelectric conversion device 13 that is divided in two in the up and down direction are disposed above the reflecting face 11. Light emitted from the laser source 12 reaches the reflecting face 11 after transmitting through the surface keeping window plate 10, reflected thereby again transmits through the surface keeping window plate 10 and is introduced to the photoelectric conversion element 13 where it is converted into an electric signal. At this occasion, the surface keeping window plate 10 is installed to the probe holder 9 via an angle adjusting mechanism 30 such that an angle thereof relative to an incident optical path from the laser source 12 or an emitting optical path of the laser reflected by the reflecting face 11 can be adjusted to cope with a case where the optical path of the laser light is changed by influence of the refractive index of the liquid or the like.

The electric signal provided by the photoelectric conversion device 13 is sent to a controller 14 (wirings are not illustrated). Based on this signal, the controller 14 controls the height of the XYZ scanner such that bending of the probe 7 does not exceed a prescribed value when the probe 7 is made proximate to the sample or during observation of the surface thereof, and further an image of a surface configuration is formed by the control signal.

Light emitted from a light source 15 for measuring light information is modulated by an AO modulator (acousto-optical modulator) 16, condensed by a second lens 17, introduced into the probe 7 and irradiated on the sample 1 from the distal end of the probe 7.

The light irradiated on the sample 1 from the distal end of the probe 7 reaches the first lens 4 after transmitting through the sample 1 and the liquid holding sample plate 2, becomes a parallel light and reaches a third lens 18 after its direction is changed by the mirror 5. The light condensed by the third lens 18 transmits through a half mirror 19, a portion thereof reaches a CCD 20 and the other portion is introduced into a photomultiplier 22 after passing through a pin hole 21. The AO modulator 16, the CCD 20 and the photomultiplier 22 are connected to the controller 14.

An optical image can be provided by simultaneously performing detection of the optical information and observation of the surface configuration of the sample by a two-dimensional scanning. Here, the SN ratio can be improved by a lock-in amplifier incorporated in the controller 14 in the case where the light from the light source 15 is modulated or vibration is caused between the probe 7 and the sample 1. In the case where the modulation etc. is not performed on the light from the light source 15, the signal of the photoelectric conversion element 13 is directly read without processing it through the lock-in amplifier.

In the fluorescent light observation, the lock-in amplifier is not used in the case where photon counting is performed. In this case, the optical image is constituted by a number of counts of photons. Further, the modulation of the irradiated light by the AO modulator 16 is effective in the case where the probe 7 is vibrated since the irradiation vibration on the sample 1 can be controlled by synchronizing it with the vibration of the probe 7.

Measurement examples by using the device illustrated in FIG. 1 are shown as follows.

MEASUREMENT EXAMPLE 1

First, an explanation will be given of various elements of the device used in the measurement example. In forming the probe 7, an optical fiber is pulled, molten and cut while a $CO_2$ gas laser is being irradiated thereon whereby it is sharpened. Then, the distal end thereof is bent in a hook-like shape by further irradiating the $CO_2$ gas laser thereon, thereby providing the probe 7 in a cantilever form having the distal end shape as illustrated in FIG. 1. The distal end portion is further sharpened up to a necessary diameter by chemical etching. A 200-nm-thick aluminum film is coated at portions other than the portion of the distal end of the probe 7 for transmitting light to provide light shielding performance.

In the case where the length of the probe 7 is 2–4 mm, the spring constant is 2–20 N/m and the representative resonant frequency and Q-factor of the probe 7 in air are substantially 17 kHz and 240, respectively. When the probe 7 is put into a liquid, the resonant frequency is reduced to substantially 14 kHz, and the Q-factor is reduced to substantially 28, that is, an eighth of the original value. However, such properties are sufficient in applying the present invention.

In the case where the probe 7 is excited by the bimorph vibrator 8, it is necessary to apply the bimorph vibrator with an exciting voltage in a liquid approximately 10 times as much as that in air to obtain an amplitude the same as that in air. Specifically, in the case where an amplitude of 20–200 nm is to be provided at the distal end of the probe 7 in a liquid in this measurement example, an a.c. voltage having the effective value of 1 through 10 V and the frequency of 10 through 40 kHz is applied on the bimorph vibrator 8. Here, the length of a portion of the probe 7 functioning as a cantilever is 2–4 mm.

Figure 2A:
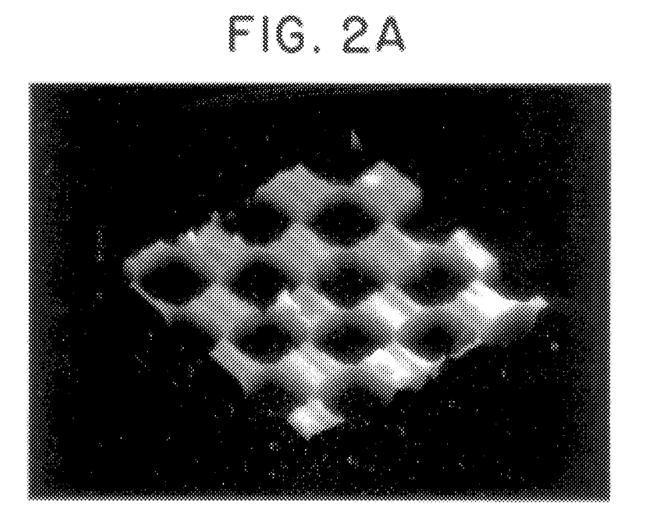
FIG. 2A is a photograph showing a topographic image and FIG. 2B is a photograph showing an optical transmission image.
Figure 2B:
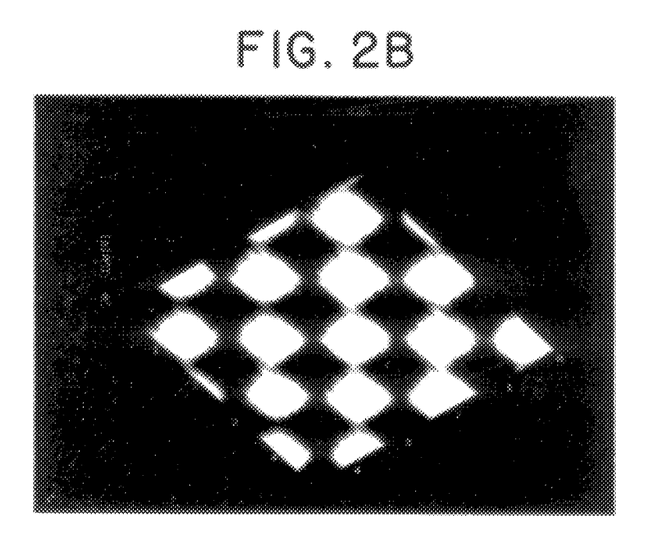

FIGS. 2A and 2B show a result of observing a sample immersed in a liquid by a scanning near-field optic/atomic-force microscope with observing function in liquid having the above-mentioned structure. In the sample, a checkered pattern having squares of 1 $\mu$m×1 $\mu$m is formed on a quartz plate by a chromium coating having a thickness of 20 nm.

FIG. 2A is a topographic image measured by the interatomic force. That is, as shown in FIG. 1, a change in the amplitude of the probe 7 is detected by an electric signal converted by the laser source 12, the reflecting face 11 and the photoelectric conversion device 13. The sample is vertically moved by a piezoelectric element in the Z direction provided in the XYZ scanner 6 in accordance with an irregularity of the sample such that the amplitude is maintained constant. FIG. 2A displays the electric signal applied on the piezoelectric element at that occasion on a CRT by using image processing technology using a computer. FIG. 2B is an optical transmission image by the near-field effect. The transmitted light of the sample is converted into an electric signal by the photomultiplier 22 similarly as shown in FIG. 1 and the converted electric signal is displayed on the CRT by using the image processing technology using a computer. Protruded portions of the topological image in FIG. 2A designate the chromium layer having the thickness of 20 nm. Further, portions of the optical transmission image of FIG. 2B corresponding to the chromium layer become dark since the light is not transmitted therethrough. In this case the planer measurement resolution is equal to or less than 100 nm.

MEASUREMENT EXAMPLE 2

The above-mentioned Measurement Example 1 has been performed to confirm the principle of measurement of the device of the present invention whereas cells are observed in water as shown in FIGS. 3A, 3B, 4A and 4B. As a sample, keratinocyte cells of a mouse are cultured on a 5 mm×5 mm cover slip. The cells are fixed by an aqueous solution of 2% paraformaldehyde before observation.

Figure 3A:
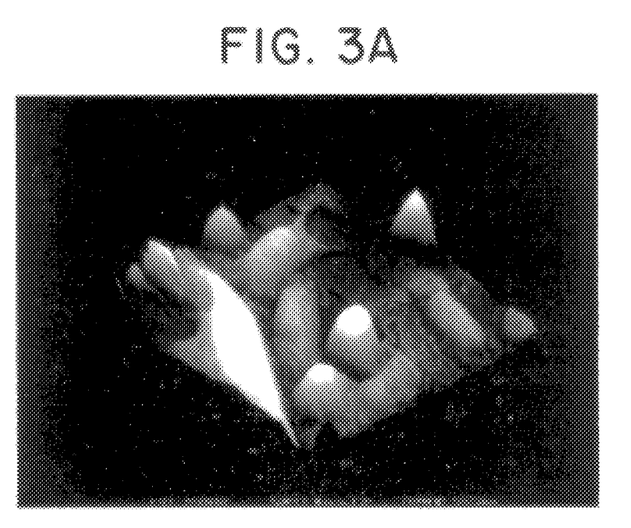
FIG. 3A is a photograph showing a topographic image and FIG. 3B is a photograph showing a transmission optical image.
Figure 3B:
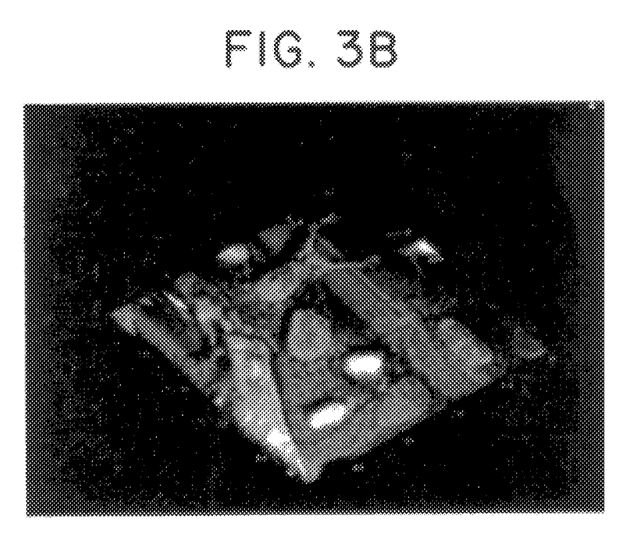

FIGS. 3A and 3B are a topological image and an optical transmission image when the cells are observed in a wide range. An image in a range of 50 $\mu$m×50 $\mu$m is provided on the CRT. In such a wide range of observation to this degree, details are not displayed since a number of points of measurement is sporadic and, therefore, there is no significant difference between the topological image of FIG. 3A and the optical transmission image of FIG. 3B.

Figure 4A:
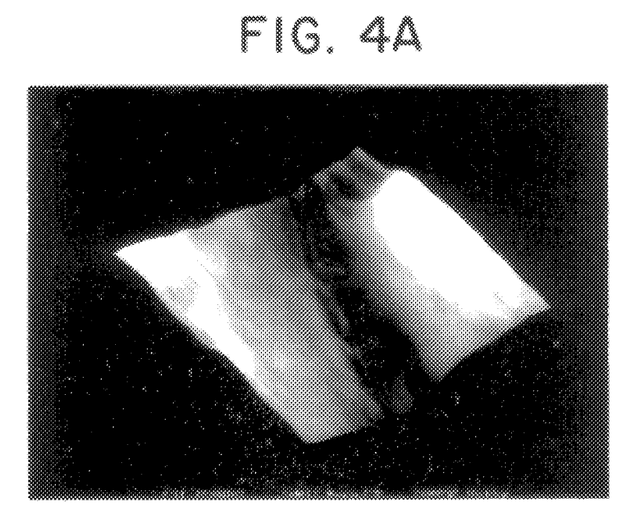
FIG. 4A is a photograph showing a topographic image and FIG. 4B is a photograph showing a transmission optical image.
Figure 4B:
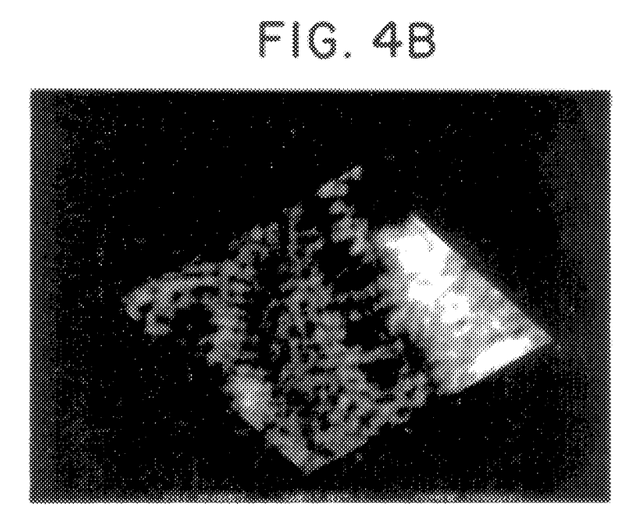

Meanwhile, FIGS. 4A and 4B show a topological image and an optical transmission image when the cells are observed in a narrow range. Images in a range of 10 $\mu$m×10 $\mu$m are provided on the CRT. In this case, there is a significant difference between the topological image of FIG. 4A and the optical transmission image of FIG. 4B in contrast to the former case. Although a filamentous structure in cells is confirmed in the optical transmission image of FIG. 4B, such a structure is not found in the topological image of FIG. 4A. That is, the optical transmission image of FIG. 4B strongly reflects a difference in optical characteristics caused by the structure in the cells. If the resolution to the degree of this measurement example is provided and the scanning can be performed in a narrow range, it is possible to display the above-mentioned information in the cells on the CRT.

It has been confirmed by the above-mentioned examples that the filamentous structure in the vicinity of the surface of the cell can be observed from the outside of the cell in living state by using the scanning near-field optic/atomic-force microscope with observing function in liquid according to the present invention. This cannot be observed by the conventional optical microscope due to limits of the resolution and the contrast.

Figure 5:
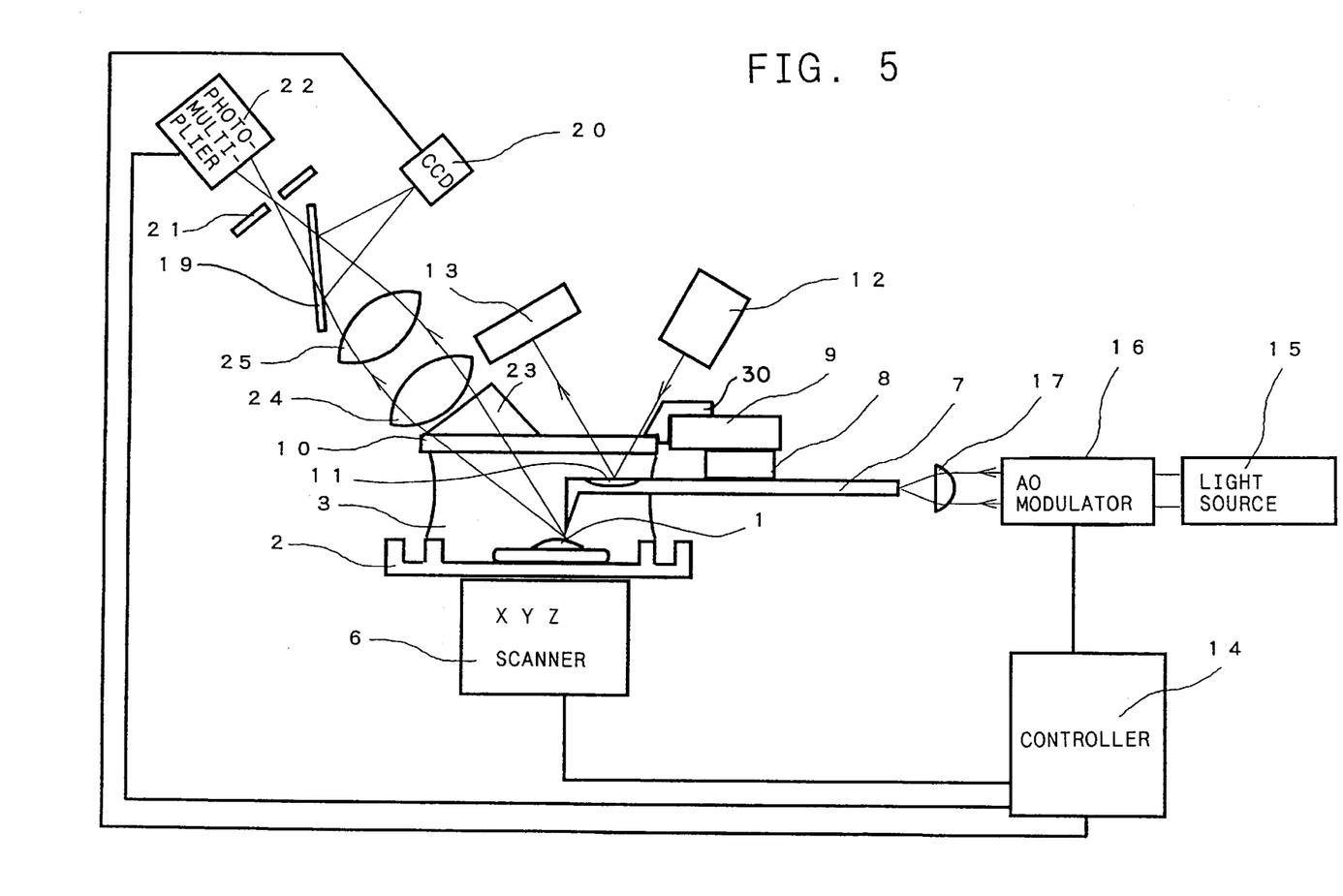
FIG. 5 is a schematic view showing an example of the structure of a scanning near-field optic/atomic-force microscope with observing function in liquid according to the present invention in the case where a reflected light is observed.

FIG. 5 illustrates a second embodiment of the present invention and is a schematic view showing the structure of a scanning near-field optic/atomic-force microscope with observing function in liquid in the case where a reflected light is observed.

In FIG. 5, the sample 1 is immersed in the arbitrary liquid 3 held in the liquid holding sample plate 2. The liquid holding sample plate 2 is placed on the XYZ scanner 6 movable in the longitudinal, transverse and height directions.

The probe 7 is fixed to the probe holder 9 via the bimorph vibrator 8. The surface keeping window plate 10 is arranged above the probe 7 and in front of the probe holder 9 and is disposed at a height whereby a liquid layer is formed by a surface tension between it and the liquid holding sample plate 2 when the distal end of the probe 7 is made proximate to the vicinity of the surface of the sample 1.

The reflecting face 11 is constituted at a portion on the upper side of the probe 7. The laser source 12 and the photoelectric conversion element 13 divided in two in the up and down direction and are provided above the reflecting face 11. Light emitted from the laser source 12 reaches the reflecting face 11 after transmitting through the surface keeping window plate 10, is reflected thereby, again transmits through the surface keeping window plate 10 and is introduced into the photoelectric conversion element 13 where it is converted into an electric signal. At this occasion the, surface keeping window plate 10 is installed to the probe holder 9 via an angle adjusting mechanism 30 such that an angle thereof can be adjusted relative to an incident light path from the laser source 12 or an emitting light path of the laser light reflected by the reflecting face 11 to cope with a case where the optical path of the laser light is changed by influence of the diffractive index of the liquid etc.

The electric signal provided by the photoelectric conversion element 13 is sent to the controller 14 (wirings are not illustrated). Based on the signal the controller 14 controls the height of the probe 7 by the XYZ scanner 6 such that the bending of the probe 7 does not exceed a prescribed value in approaching the probe or in observing the surface of the sample by the probe 7 and a topological image is formed from the control signal.

Light emitted from the light source 15 for measuring light information is modulated by an AO modulator (acousto-optical modulator) 16, successively introduced to the probe 7 by being condensed by the second lens 17 and is irradiated on the sample 1 from the distal end of the probe 7.

The light irradiated on the sample 1 from the distal end of the probe 7 is reflected by the surface of the sample 1 and reaches the surface keeping window plate 10. A prism 23 is installed at the front and on the upper side of the surface keeping window plate 10 and a fourth lens 24, a fifth lens 25, the half mirror 19, the pin hole 21 and the photomultiplier 22 are installed on an axis line of an emitting light from the prism 23.

The light transmitted through the surface keeping window plate 10 is condensed by the fourth lens 24 and the fifth lens 25, transmits through the half mirror 19 and a portion thereof reaches the CCD 20 and the other portion thereof is introduced to the photomultiplier 22 after passing through the pin hole 21. The AO modulator 16, the CCD 20 and the photomultiplier 22 are connected to the controller 14.

The mechanism of detecting light information and observing configuration in this embodiment is basically the same as that in the first embodiment.

Although the probe used in this embodiment is basically provided with an aluminum coating and a very small opening is formed at the distal end thereof, it is possible to enhance corrosion resistance in liquid by further providing a gold coating, on the aluminum coating. As the corrosion resistant coating, a coating film of platinum, titanium, $SiO_2$, $Si_3N_4$, $Al_2O_3$, polyethylene etc. other than gold can be used.

As has been explained, in the present invention a scanning near-field optic/atomic-force microscope featuring in the structure for observing the configuration and the optical characteristic on the surface of a sample is applied to solve the problem of a near-field microscope which has been expected in observing a biological sample, an organic thin film sample or the like wherein the liquid holding sample plate for holding the liquid and the sample and the surface keeping window plate for holding the surface of the liquid are respectively disposed below the sample and above the sample independently and with no contact with each other and at positions capable of maintaining the liquid between the liquid holding sample plate and the surface keeping plate by a surface tension whereby the liquid is held always in a layer under the surface keeping window plate. Therefore, the scanning of the probe can be performed always under the liquid surface and a biological sample, an organic thin film sample or the like can be observed in the liquid.

What is claimed is:

1. A scanning near-field optic/atomic-force microscope with observing function in liquid comprising:
    a liquid holding sample plate for immersing and holding a sample in a liquid;
    a surface keeping window plate arranged above the liquid holding sample plate for covering a surface of the liquid;
    a probe having an optical propagation body for propagating light, a transmission hole for transmitting the light which propagates through the propagation body at a distal end portion thereof to irradiate the sample, and light reflecting means disposed on the probe, the distal end portion being immersed in the liquid and arranged above an upper surface of the sample;
    a probe holder for holding the probe;
    a light source for outputting light to the optical propagation body of the probe to irradiate the sample via the transmission hole;
    detecting means for detecting light information from the light irradiated on the sample and converting the light information into an electric signal;
    a laser source for irradiating the light reflecting means of the probe with a laser light for detecting a bending amount of the probe caused by an interaction between the sample and the probe, the surface keeping window plate being comprised of a material which transmits the laser light and is provided with an angle adjusting mechanism for adjusting an optical axis of the laser lights;
    a photoelectric conversion device for receiving a reflected light from the light reflecting means and converting the reflected light into an electric signal;
    moving means for moving the sample relative to the probe; and
    distance controlling means for controlling a distance between the surface of the sample and the distal end of the probe.

2. A scanning near-field optic/atomic-force microscope comprising:
    a holder for holding a sample immersed in a liquid;
    a plate disposed over the holder for covering a surface of the liquid;
    a probe having a distal end immersed in the liquid and disposed over a surface of the sample for irradiating light on the surface of the sample;
    a light reflecting element disposed on the probe and immersed in the liquid;
    a laser source for irradiating the light reflecting element with a laser light for detecting a bending amount of the probe resulting from an interaction between the sample and the probe;
    an angle adjusting mechanism for adjusting an optical axis of the laser light;
    a photoelectric conversion device for receiving the laser light reflected from the light reflecting element and converting the received reflected light into an electric signal;
    a moving mechanism for moving the sample relative to the probe; and
    a distance control device for controlling a distance between a surface of the sample and the distal end of the probe.

3. A scanning near-field optic/atomic-force microscope according to claim 2; further comprising a light source for emitting the light irradiated on the sample; and a detecting device for detecting information from the light irradiated on the sample and converting the information to an electric signal.

4. A scanning near-field optic/atomic-force microscope according to claim 3; wherein the probe comprises an optical propagation body for propagating the light emitted by the light source, and a transmission hole for transmitting the light at the distal end of the probe to irradiate the sample.

5. A scanning near-field optic/atomic-force microscope according to claim 3; wherein the detecting device is positioned to detect information from irradiated light which is transmitted through the sample.

6. A scanning near-field optic/atomic-force microscope according to claim 3; wherein the detecting device is positioned to detect information from irradiated light which is reflected from the sample.

7. A scanning near-field optic/atomic-force microscope according to claim 2; further comprising a probe supporting device for supporting the probe and being connected to the angle adjusting mechanism.

8. A scanning near-field optic/atomic-force microscope according to claim 2; wherein the holder and the plate are physically separated from one another by the liquid.

9. A scanning near-field optic/atomic-force microscope according to claim 2; wherein the plate is disposed over the holder at a position effective to form a liquid layer between the plate and the holder by surface tension between the plate and the holder.

10. A scanning near-field optic/atomic-force microscope according to claim 2; further comprising vibrating means for vibrating the probe relative to the surface of the sample.

11. A scanning near-field optic/atomic-force microscope according to claim 10; wherein the vibrating means includes means for vibrating the probe in a plane orthogonal to the surface of the sample.

12. A scanning near-field optic/atomic-force microscope comprising:

- a holder for holding a sample immersed in a liquid;
- a plate disposed over the holder for covering a surface of the liquid;
- a probe having an optical propagation body for propagating light, a distal end immersed in the liquid and disposed over a surface of the sample, and a transmission hole at the distal end of the optical propagation body for transmitting the light to irradiate the sample;
- a light reflecting element disposed on the probe and immersed in the liquid;
- a probe supporting device for supporting the probe;
- a light source for emitting light to the optical propagation body;
- a detecting device for detecting information from the light irradiated on the sample and converting the information to an electric signal;
- a laser source for irradiating the light reflecting element with a laser light for detecting a bending amount of the probe resulting from an interaction between the sample and the probe;
- an angle adjusting mechanism for adjusting an optical axis of the laser light;
- a photoelectric conversion device for receiving the laser light reflected from the light reflecting element and converting the received reflected light into an electric signal;
- a moving mechanism for moving the sample relative to the probe; and
- a distance control device for controlling a distance between a surface of the sample and the distal end of the probe.

13. A scanning near-field optic/atomic-force microscope according to claim 12; wherein the probe supporting device is connected to the angle adjusting mechanism.

* * * * *

UNITED STATES PATENT AND TRADEMARK OFFICE
CERTIFICATE OF CORRECTION

PATENT NO. : 5,821,409

DATED : October 13, 1998

INVENTOR(S) : Katsunori Honma, et al.

It is certified that error appears in the above-identified patent and that said Letters Patent is hereby corrected as shown below:

On the title page, Item [30] add the following priority data:

Foreign Application Priority Data

August 23, 1995     [JP]    Japan..........................7-237730

Signed and Sealed this

Ninth Day of November, 1999

*Attest:*

Q. TODD DICKINSON

*Attesting Officer*     *Acting Commissioner of Patents and Trademarks*